United States Patent
Kottur et al.

(10) Patent No.: US 11,698,613 B2
(45) Date of Patent: Jul. 11, 2023

(54) SYSTEM FOR MONITORING SMART UTILITIES

(71) Applicant: CARRIER CORPORATION, Palm Beach Gardens, FL (US)

(72) Inventors: Guru Charan Kottur, Telangana (IN); Aditya Swami, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/252,965

(22) PCT Filed: Oct. 4, 2019

(86) PCT No.: PCT/US2019/054719
§ 371 (c)(1),
(2) Date: Dec. 16, 2020

(87) PCT Pub. No.: WO2020/086235
PCT Pub. Date: Apr. 30, 2020

(65) Prior Publication Data
US 2021/0240152 A1    Aug. 5, 2021

(30) Foreign Application Priority Data
Oct. 26, 2018   (IN) .............. 201811040476

(51) Int. Cl.
*G05B 19/042* (2006.01)
*F24F 11/30* (2018.01)
(Continued)

(52) U.S. Cl.
CPC ............ *G05B 19/042* (2013.01); *F24F 11/30* (2018.01); *G08B 7/06* (2013.01); *H04L 67/12* (2013.01);
(Continued)

(58) Field of Classification Search
CPC ........ G05B 19/042; F24F 11/30; H04W 4/33; H04W 4/021; G08B 7/06; H04L 67/12
(Continued)

(56) References Cited

U.S. PATENT DOCUMENTS 7,203,497 B2  4/2007  Belcea
9,247,378 B2  1/2016  Bisson et al.
(Continued)

FOREIGN PATENT DOCUMENTS

WO  WO-2017085546 A1 *  5/2017  ............ G06F 21/31
WO  2017092802 A1  6/2017
WO  2018054976 A1  3/2018

OTHER PUBLICATIONS

ISR/WO; Application No. PCT/US2019/054719; dated Dec. 16, 2019; 15 pages.
(Continued)

*Primary Examiner* — Mohammad Ali
*Assistant Examiner* — Joshua T Sanders
(74) *Attorney, Agent, or Firm* — Cantor Colburn LLP

(57) ABSTRACT

Disclosed is a system including one or more smart utilities, and a personal smart device configured to: communicate with the one or more smart utilities over one or more networks, instruct the one or more smart utilities to return self-identifying information, and instruct one or more of the one or more smart utilities, individually or as a subgroup, to activate an identifying beacon.

8 Claims, 2 Drawing Sheets

(51) Int. Cl.
*H04W 4/33* (2018.01)
*G08B 7/06* (2006.01)
*H04L 67/12* (2022.01)

(52) U.S. Cl.
CPC ..... *H04W 4/33* (2018.02); *G05B 2219/25011* (2013.01); *G05B 2219/2614* (2013.01)

(58) Field of Classification Search
USPC .......................................................... 700/276
See application file for complete search history.

(56) References Cited

U.S. PATENT DOCUMENTS

| | | |
|---|---|---|
| 9,344,989 B2 | 5/2016 | Varoglu et al. |
| 9,575,477 B2 | 2/2017 | Blount et al. |
| 9,690,265 B2 | 6/2017 | Casilli |
| 9,819,509 B2 | 11/2017 | Nugent et al. |
| 2009/0045929 A1 | 2/2009 | Jette |
| 2009/0045939 A1 | 2/2009 | Holland et al. |
| 2011/0115816 A1* | 5/2011 | Brackney ............... H05B 47/10 700/295 |
| 2013/0289751 A1 | 10/2013 | Mignot et al. |
| 2014/0135042 A1* | 5/2014 | Buchheim ............... G01S 1/725 455/566 |
| 2014/0324590 A1 | 10/2014 | Kong et al. |
| 2015/0277407 A1 | 10/2015 | Vanderkoy et al. |
| 2016/0258638 A1* | 9/2016 | Waseen ................... H04W 4/70 |
| 2016/0286363 A1 | 9/2016 | Vincent et al. |
| 2016/0327293 A1* | 11/2016 | Grabowski .............. F24F 11/30 |
| 2017/0115642 A1 | 4/2017 | Sridharan et al. |

OTHER PUBLICATIONS

Werb et al., "Designing a positioning system for finding things and people indoors," in IEEE Spectrum, vol. 35, No. 9, Sep. 1998, pp. 71-78.

\* cited by examiner

SYSTEM FOR MONITORING SMART UTILITIES

CROSS REFERENCE TO RELATED APPLICATIONS

This is a US National Stage of Application No. PCT/US2019/054719 filed on Oct. 4, 2019, which claims the benefit of IN Application No. 201811040476 filed Oct. 26, 2018, the disclosures of which are incorporated herein by reference.

BACKGROUND

The embodiments herein relate to a monitoring system and more specifically to a monitoring system for monitoring installed smart utilities.

Technicians or building owners may find it difficult to identify the installed location of various equipment including controllers of chillers, elevators, fire and security equipment etc., when seeking to maintain the location information of inventory and also aid any technicians to locate the devices.

SUMMARY

Disclosed is a system including one or more smart utilities distributed in a building or other location (may be outside), and a personal smart device configured to communicate with the one or more smart utilities over one or more networks, instruct one or more smart utilities to return self-identifying information, and instruct one or more of the plurality of smart utilities that responded with self-identifying information, individually or as a subgroup, to activate an identifying beacon.

Further disclosed is a method wherein the smart device communicating with the one or more smart utilities over one or more networks, instructing the one or more smart utilities to return self-identifying information, and instructing one or more of the one or more smart utilities, individually or as a subgroup, to activate an identifying beacon.

In addition to one or more of the above disclosed features the self-identifying information includes one or more of: a type of smart utility, a geographic location identifying whether within the building or at an outside location, a floor in the building on which the smart utility is located, and a subdivision in the building where the smart utility is located.

In addition to one or more of the above disclosed features the personal smart device aggregates into a dataset received self-identifying information from the one or more smart utilities and forwards the aggregated dataset to a building management system (BMS).

In addition to one or more of the above disclosed features the subgroup is one or more of the type of smart utility, the floor in the building on which the smart utility is located, and the subdivision in the building where the smart utility is located.

In addition to one or more of the above disclosed features, in one embodiment the type of smart utility is one or more of a utility controller, an HVAC equipment, a safety device or component, and transportation equipment.

In addition to one or more of the above disclosed features, in one embodiment the type of smart utility is one or more of a chiller, an elevator, a fire extinguisher and a hazard detector.

In addition to one or more of the above disclosed features, in one embodiment the personal smart device communicates with the one or more smart utilities over a respective one or more dissimilar telecommunication networks.

In addition to one or more of the above disclosed features, in one embodiment the one or more of dissimilar telecommunication networks include one or more of a personal area network, a wired local area network, and a wireless local area network.

In addition to one or more of the above disclosed features, in one embodiment the identifying beacon is one or more of a visual and an audible identifier.

In addition to one or more of the above disclosed features, in one embodiment the identifying beacon is one or more of a light emitting diode (LED) and a speaker.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
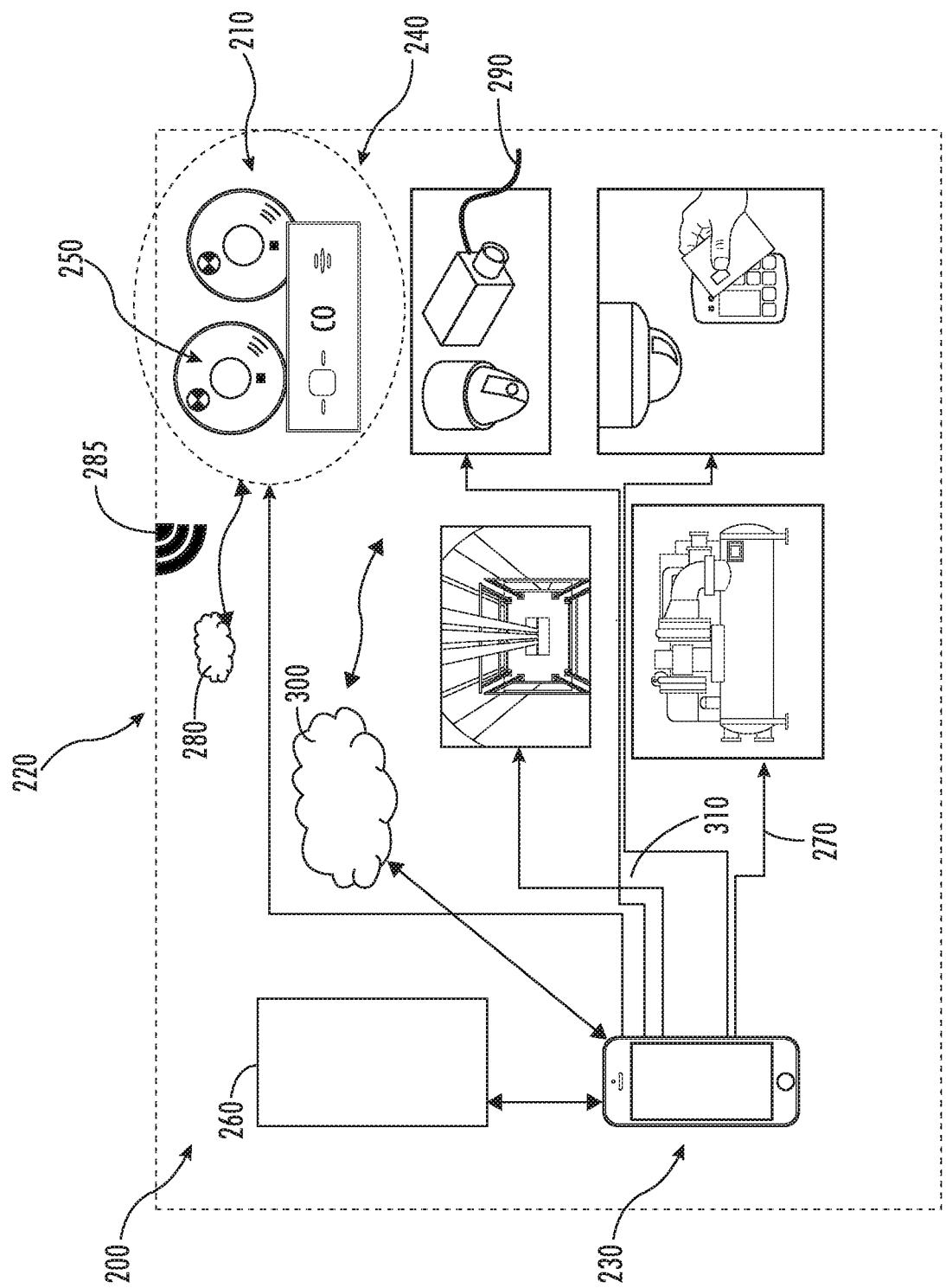
FIG. 1 illustrates components of a disclosed embodiment.

Turning to FIG. 1, disclosed is a system 200 including one or more smart utilities 210 distributed in a building 220, and a personal smart device 230 configured to communicate with the utilities 210.

Figure 2:
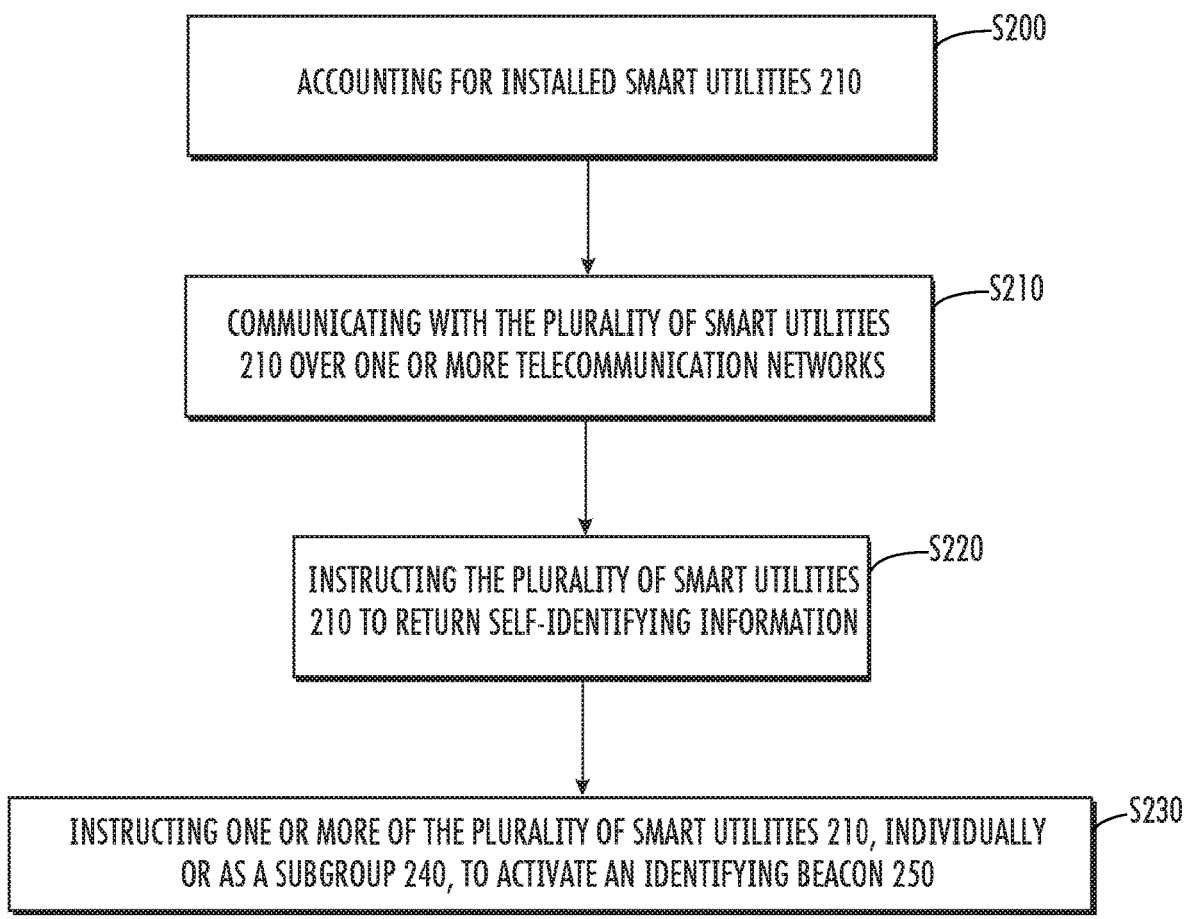
FIG. 2 illustrates steps performed by components according to an embodiment.

Turning to FIG. 2, the smart device 230 is configured to perform a process S200 of accounting for installed smart utilities 210. S200 includes step S210 of the smart device 230 communicating with the one or more smart utilities 210 over one or more telecommunication networks. At step S220 the smart device 230 transmits first instructions the one or more smart utilities 210 to return self-identifying information. At step S230 the smart device 230 transmits second instructions to one or more of the one or more smart utilities 210, individually or as a subgroup 240, to activate an identifying beacon 250. In one embodiment the smart device 210 transmits the second instructions only to one or more smart utilities that returned self-identifying information in response to the first instructions.

In one embodiment the self-identifying information includes one or more of: a type of smart utility, a geographic location identifying whether the smart utility is within the building or at an outside location, a floor in the building on which the smart utility is located, and a subdivision in the building where the smart utility is located. In one embodiment the personal smart device 230 aggregates into a dataset received self-identifying information from the one or more smart utilities 210 and forwards the aggregated dataset to a building management system (BMS) 260 explained in greater detail below.

In one embodiment the subgroup 240 is one or more of the type of smart utility, a floor in the building on which the smart utility is located, and a subdivision in the building where the smart utility is located. Subdivisions may be divided areas such as laboratories, utility rooms, hotel wings, conference centers, dining areas, and the like.

In one embodiment the type of the smart utility 210 may be one or more of a utility controller, heating ventilation and air conditioning (HVAC) equipment, safety device or component, and a transportation equipment such as elevators and escalators. As a further example, the type of the smart utility 210 may be one or more of a chiller, an elevator, a fire extinguisher and a hazard detector.

In one embodiment the personal smart device 230 communicates with the one or more smart utilities 210 over a respective one or more dissimilar telecommunication networks 270. For example the one or more dissimilar telecommunication networks 270 may include one or more of a personal area network (PAN) 280 such as Bluetooth that communicates for example over a PAN beacon 285, a wired local area network (W-LAN) 290, a wireless local area network (LAN) 300, and ad hoc networks 310, both wired and wireless. These are non-limiting examples of networks with which the disclosed system is capable of communicating.

According to another aspect of the disclosed embodiments the identifying beacon 250 may be one or more of a visual and an audible identifier. For example the identifying beacon 250 may be a light emitting diode (LED) or a speaker.

The above disclosed embodiments provide for locating various devices or equipment including controllers of HVAC chillers or elevators, fire and security devices or other equipment or devices in a building or other location or facility. Such locating is provided by a smart device such as one using a mobile app broadcasting, to the various utilities an identity request. The broadcast may be transmitted over various communication channels including Bluetooth, LAN including Wi-Fi. The devices may respond to the broadcast request with location information and other details for identifying the device. According to the disclosed embodiments the smart device may transmit an "identify yourself" request to any desired device or group of devices and the device or group of devices can turn on the LED or any other visual or audible mechanism to spot the desired device.

Benefits of the disclosed embodiments include more easily locating or identifying any type of smart utility and/or any type of controllers (for example a type of controller referenced above) in a building to help technicians or building owners to ease maintenance of the building infrastructure. An aggregated inventory of device locations may be automatically transmitted to a central repository such as a building management system.

A building management system (BMS), reference above, may be otherwise known as a building automation system (BAS). The BMS is a computer-based control system installed in buildings that may have a need for controlling and monitoring mechanical and electrical equipment such as ventilation, lighting, power systems, fire systems, security systems, fire alarm systems and elevator systems. In addition to controlling an internal environment in a building, BMS systems may provide for access control (access doors) for implementing building security protocols, or to control other security systems such as closed-circuit television (CCTV) and motion detectors. A BMS may be responsible for controlling equipment that accounts for a majority of energy usage in a building.

As used herein, "smart devices" may contain one or more processors capable of communication using with other such devices by applying wired and/or wireless telecommunication protocols. Non-limiting examples of a smart device include a mobile phone, personal data assistant (PDA), tablet, watch, wearable or other processor-based devices. Protocols applied by smart devices may include local area network (LAN) protocols and/or a private area network (PAN) protocols. LAN protocols may apply Wi-Fi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radio-frequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system comprising:
   smart utilities and a personal smart device, wherein the smart utilities include: a utility controller; transportation equipment including an elevator; HVAC equipment electrical equipment including lighting; a safety device including one or more of a fire extinguisher and a hazard detector; and a security system component including a motion detector,
   wherein smart utilities and a personal smart device is configured to:
   communicate with the smart utilities over one or more networks that differ from each other,
   transmit first instructions to the smart utilities to return self-identifying information,
   wherein the self-identifying information includes: a type of smart utility; a geographic location identifying whether the smart utility is within a building or at an outside location; a floor in the building on which the smart utility is located; and a subdivision in the building where the smart utility is located, and
   transmit second instruction to a plurality of the smart utilities, as a subgroup, to activate an identifying beacon,
   wherein the subgroup includes more than one of the smart utilities grouped by the type of smart utility, the floor in the building on which the smart utility is located, and the subdivision in the building where the smart utility is located, and
   wherein the identifying beacon is one or more of a visual and an audible identifier, and
   wherein the personal smart device aggregates into a dataset of received self-identifying information from the smart utilities and forwards the aggregated dataset to a building management system (BMS) for monitoring and controlling of the smart utilities by the BMS.

2. The system of claim 1 wherein the personal smart device transmits the second instructions only to the smart utilities that returned self-identifying information in response to the first instructions.

3. The system of claim 1 wherein the telecommunication networks include a personal area network, a wired local area network, and/or a wireless local area network.

4. The system of claim 1 wherein the identifying beacon is one or more of a light emitting diode (LED) and a speaker.

5. A method identifying of smart utilities, comprising:
   communicating, with a personal smart device, over a respective one or more networks that differ from each other, wherein the smart utilities include: a utility controller; transportation equipment including an elevator; HVAC equipment; electrical equipment including lighting; a safety device including one or more of a fire extinguisher and a hazard detector; and a security system component including a motion detector,
   transmitting first instructions, with the personal smart device, to the smart utilities to return self-identifying information, wherein the self-identifying information includes: a type of smart utility; a geographic location identifying whether the smart utility is within a building or at an outside location; a floor in the building on which the smart utility is located; and a subdivision in the building where the smart utility is located, and
   transmitting second instructions, with the personal smart device, to a plurality of the smart utilities, as a subgroup, to activate an identifying beacon, wherein the subgroup includes one or more of the smart utilities grouped by the type of smart utility, the floor in the building on which the smart utility is located, and the subdivision in the building where the smart utility is located, and
   wherein the identifying beacon is one or more of a visual and an audible identifier, and
   wherein the personal smart device aggregates into a dataset of received self-identifying information from the smart utilities and forwards the aggregated dataset to a building management system (BMS) for monitoring and controlling of the smart utilities by the BMS.

6. The method of claim 5 wherein the personal smart device transmits the second instructions only to smart utilities that returned self-identifying information in response to the first instructions.

7. The method of claim 5 wherein the telecommunication networks include a personal area network, a wired local area network, and/or a wireless local area network.

8. The method of claim 5 wherein the identifying beacon is one or more of a light emitting diode (LED) and a speaker.

* * * * *